(12) United States Patent
Sato (10) Patent No.: US 9,897,495 B2
(45) Date of Patent: Feb. 20, 2018

(54) ROBERVAL-TYPE LOAD CELL

(71) Applicant: A&D Company, Limited, Tokyo (JP)

(72) Inventor: Isao Sato, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 188 days.

(21) Appl. No.: 14/441,718

(22) PCT Filed: Nov. 12, 2012

(86) PCT No.: PCT/JP2012/079286
§ 371 (c)(1),
(2) Date: May 8, 2015

(87) PCT Pub. No.: WO2014/073110
PCT Pub. Date: May 15, 2014

(65) Prior Publication Data
US 2015/0292965 A1 Oct. 15, 2015

(51) Int. Cl.
*G01L 1/22* (2006.01)
*G01G 3/14* (2006.01)
*G01G 23/00* (2006.01)

(52) U.S. Cl.
CPC .......... *G01L 1/2262* (2013.01); *G01G 3/1402* (2013.01); *G01G 23/005* (2013.01); *G01L 1/2243* (2013.01)

(58) Field of Classification Search
CPC ... G01L 1/2206; G01L 1/2243; G01L 1/2262; G01G 3/1402

USPC .................................................. 73/774, 818
See application file for complete search history.

(56) References Cited

U.S. PATENT DOCUMENTS

| 4,892,163 A | 1/1990 | Aumard |
| 2011/0232393 A1* | 9/2011 | Aumard ............... G01G 3/1412 73/783 |

FOREIGN PATENT DOCUMENTS

| JP | 56-114734 A | 9/1981 |
| JP | 62-066127 A | 3/1987 |
| JP | 2-150537 U | 12/1990 |
| JP | 2001-050826 A | 2/2001 |
| JP | 2010-107527 A | 5/2010 |

* cited by examiner

*Primary Examiner* — David M Gray
*Assistant Examiner* — Andrew V Do
(74) *Attorney, Agent, or Firm* — Roberts Mlotkowski Safran Cole & Calderon P.C.

(57) ABSTRACT

A load cell includes a flexural element in which a Roberval mechanism is formed by a pair of top and bottom parallel beams each including two thin sections at a back and a front in a longitudinal direction, which are integrated with a fixed portion and a movable portion, and strain gauges bonded to the thin sections. Strain gauges are bonded to one of the thin sections of pulling side and to one of the thin sections of compressing side, and circular apertures are formed through the remaining two thin sections. The performances of the load cell such as the reduction of the measurement error and of the period of time before the start of the measurement are achieved.

5 Claims, 9 Drawing Sheets

(c) (conventional load cell)

ROBERVAL-TYPE LOAD CELL

TECHNICAL FIELD

The present invention relates to a load cell, and, especially, relates to a Roberval load cell, which includes a flexural element in which a Roberval mechanism is formed by a pair of top and bottom parallel beams each including two thin sections at the back and the front in a longitudinal direction, which are integrated with a fixed portion and a removable portion.

BACKGROUND ART

This kind of the load cell is used for, for example, a balance for commerce and industry, and includes, as shown in Patent Publication 1 below, a flexure element of the Roberval mechanism having four thin parts in all which are composed of a top pair and a bottom pair each having two thin parts. The flexure element is disposed in a cantilever manner in which its base end is fixed to a housing, and a load is exerted on its front end. Two thin parts out of the four parts act as tension sides and another two parts act as compression sides when the load is exerted on the flexure element. Strain gauges are bonded to each of the thin parts of the tension sides and of the compression sides. The four strain gages are connected with one another to constitute the Wheatstone bridge.

PRIOR ART PUBLICATIONS

Patent Publications

Patent Publication 1: JP-A-8-184510

SUMMARY OF INVENTION

Problems to be Solved by Invention

However, a conventional load cell is composed of a rectangular block having a penetration aperture on its side surface, and keeps a longtime similar shape though a more or less dimension difference exists because of the reasons of easy fabrication and time-proven results.

Accordingly, the performances of the load cell have been increased only slightly. This slight performance increase is ascribable to, mainly, the performance of a strain gauge, the improvement of a material of a flexural element and the advance of the load cell fabrication technology, and not to creation of the shape of the load cell (flexural element).

The improvement of the performance of the load cell by devising the shape of the load cell (flexural element) has not at all been attempted to date. Under this circumstance, in an electronic balance having the load cell, though a measured value fluctuates immediately after a weight subject is placed on the weighting dish of the electronic balance, the measured value is stabilized after a while. This is because a period of time is required for stabilizing a strain (stress) generated in the thin sections, and the load cell has a higher performance when the above period of time for the stabilization is shorter.

Then, the present inventor considers how the period of time for stabilizing the measured value (the period of time for stabilizing the stress generated in the thin portion) is shortened.

At first, the present inventor has analyzed, by means of the finite element method, the stress generated in the thin portion when a load is exerted on the load cell by using the conventionally-structured load cell (flexural element) in which the four thin portions in all are composed of the top pair and the bottom pair each having the two thin sections.

As shown in FIG. 7(a), while the stress generated in the thin portion has a nearly constant magnitude near the center in the width direction, the stress at the both ends in the width direction has a value larger than the value near the center. Although the values of the stresses generated in the thin sections are theoretically the same in the width direction, the stresses are larger at the both ends practically.

As a result of the inventor's consideration, this larger stress generated at the both ends of the thin section of the load cell (flexural element) seems to correspond to an "edge load" well known in the "roller bearing" industry.

That is, for example, the contact stress between a cylindrical "roller" and an inner ring is uniform in the width direction of the "roller" in the "roller bearing" in which the cylindrical "rollers" roll between the inner ring and the outer ring. However, the contact stress is not uniform in reality. It is known that the stress at the both ends of the "roller" is larger than the stress near the center thereof, and the larger stress generated at the both ends of the "roller" is referred to as an "edge load".

It is considered that the "edge load" is also generated in the end portion of the thin section (hereinafter referred to as "edge section" similarly to the "roller bearing" when the load is exerted on the load cell (flexural element).

In this manner, since the stresses generated in the thin section when the load is exerted on the load cell (flexural element) become imbalanced between the position near the center and that near the both ends because the edge load is generated at the both ends of the thin section. Accordingly, it is supposed that when strain gauges bonded near the center of the thin section sense the stress, a measurement error may be generated while receiving the influence of the edge load, and the measurement value is stabilized only after the stresses in the width direction of the thin section are balanced and stabilized (a specified length of time is required for stabilizing the measured value).

When off-center loads are exerted on the four corners of the weighing dish, the load cell (flexural element) is twisted. It is considered that the stress generated in the thin section in this case is also influenced by the edge load.

That is, in case of the twisting of the load cell (flexural element), a virtual and neutral shaft exists at the center of the load cell (flexural element) in the width direction, which extends back and forth, and the load cell (flexural element) rotates around the virtual and neutral shaft. However, this shaft is placed near the center the of load cell (flexural element) in the width direction, and the correct position thereof cannot be definitely determined. Further, it is considered that edge load generated at the both ends of the thin section in the width direction also influences the stress near the center so as to generate a measurement error, and the measurement value is stabilized only after the stresses in the width direction of the thin section are balanced and stabilized (a specified length of time is required for stabilizing the measured value when the off-center loads are exerted as loads).

When an experiment was conducted in which a load cell was broken due to an overload, a plastic deformation is produced in the thin section of the load cell, thereby breaking the load cell (thin section).

The deformation of the thin section at this stage starts at one end of the thin section in the width direction, and the plastic deformation propagates to the other end such that a linear band appears near the center of the thin section. That is, the band generates taking, as a base point, one end of the thin section in the width direction, and the extension toward the other end suggests the generation of the edge load at the end of the thin section in the width direction.

The present inventor considers that the performances of the load cell can be improved if the edge load generated in the thin section is reduced because the edge load correlates to the performances of the load cell such as the "measurement error" and the "period of time for stabilizing the measured value" in the conventional load cell.

Then, at first, the present inventor made a prototype of a load cell in which circular penetration apertures (hereinafter referred to as "circular apertures") were formed only through two thin sections of a bottom beam of a flexural element constituting a load ell of a conventional-structure in a process of studying how the edge load generated in the thin section works and how a period of time for stabilizing the stress generated in the thin section changes when the circular apertures are formed through the thin section.

That is, after the prototype of the load cell was manufactured in which strain gauges were bonded to the two thin sections (where no circular apertures were formed) of the top beam of the flexural element and the circular apertures were formed through the centers of the two thin sections in the width direction of the bottom beam to which no strain gauges were bonded, the stresses each generated in the thin sections through which the apertures were formed and in the thin sections through which no apertures were formed were analyzed by means of the finite element method.

Figure 7:
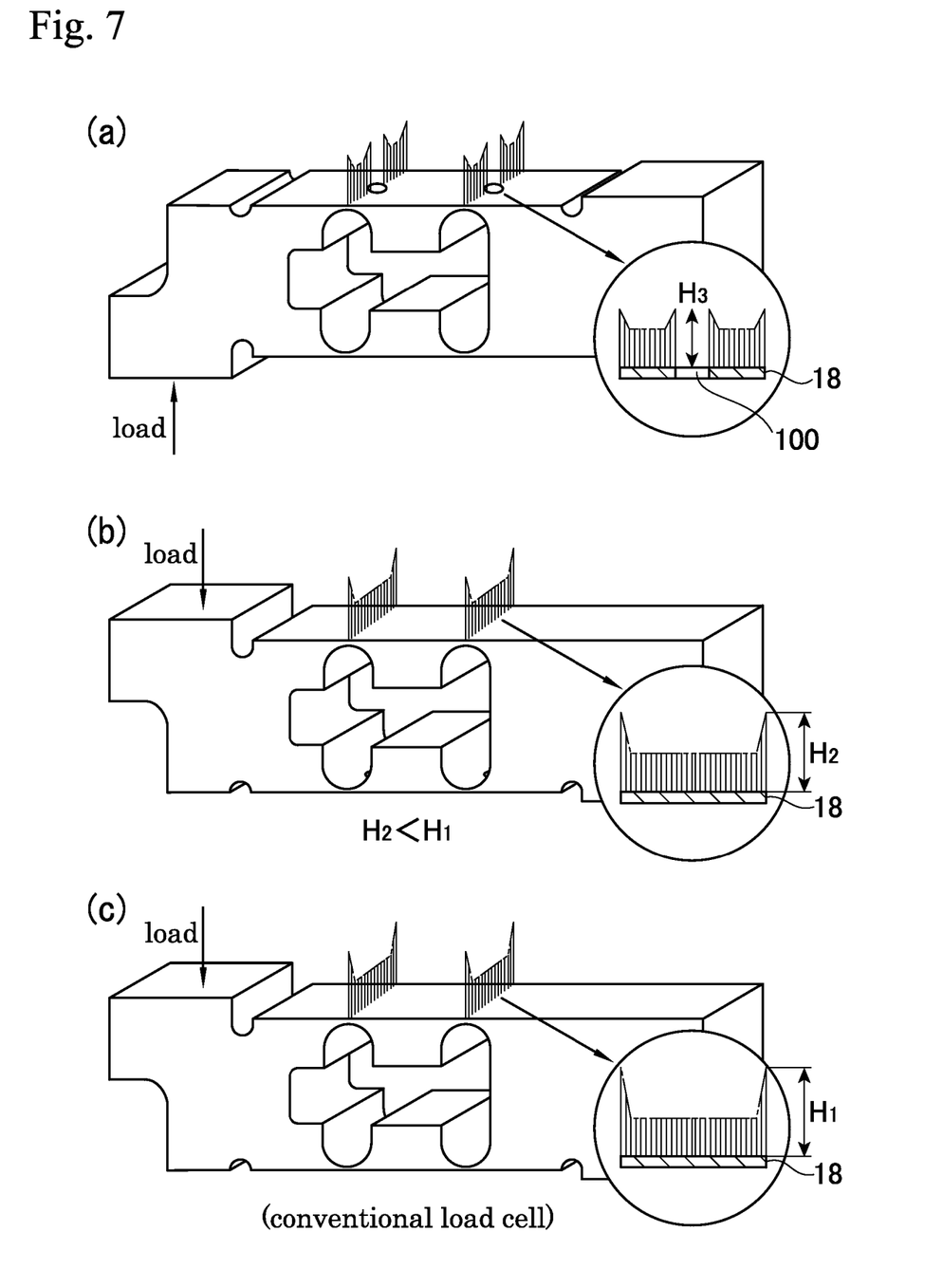
FIG. 7 Diagrams for comparing a stress generated in the thin section of the load cell with a stress generated in a thin section of a conventional load cell (Comparative Example)

Then, as shown in FIG. 7($a$), the edge loads were generated at the four ends (edge sections) in all of the thin sections having the apertures after two positions on the aperture periphery became new ends (edge sections). A value H3 of the edge load was smaller than a value H1 (H3<H1) of the edge load generated in the thin section of a conventional load cell (flexural element) (refer to FIG. 7($c$)).

On the other hand, as shown in FIG. 7($b$), the stress distribution (refer to FIG. 7($c$)) generated in the thin section having no apertures was similar to that in the thin section of the conventional load cell, and a value H2 of the edge load generated in the end (edge section) was slightly smaller than the value H1 of the conventional load ell (H3<H2<H1).

It is conjectured that the change of the characteristics of the two thin sections such as the reduction of the value of the edge load by the aperture formation influenced the characteristics of the other two thin sections having no apertures.

The prototype load cell was confirmed effective with respect to the conventional load cell in improving the performances of the load cell such as the reduction of the measurement errors and the reduction of the period of time for stabilizing the measurement value, and the present application has been reached.

The present invention has been made in view of the conventional problems and the foregoing perception of the present inventor, and its object is to increase basic performances of a load cell by forming apertures at two positions of the load cell out of four thin sections in all.

Means of Solving Problems

The present invention of Claim 1 for achieving the above object has the configuration of a Roberval load cell including a flexural element in which a Roberval mechanism is formed by a pair of top and bottom parallel beams each including two thin sections at a back and a front in a longitudinal direction, which are integrated with a fixed portion and a movable portion, and strain gauges bonded to the thin sections, wherein, when a downward load is exerted on the movable portion, compressing stresses act on the thin section near the movable portion of the top beam and on the thin section near the fixed portion of the bottom beam out of four thin sections, and pulling stresses act on the thin section near the fixed portion of the top beam and on the thin section near the movable portion of the bottom beam out of the four thin sections, and the strain gauges are bonded to either of the two thin sections on which the pulling stresses act and to either of the two thin sections on which the compressing stresses act, and nearly circular penetration apertures are formed through centers in a width direction of the two remaining thin sections on which no strain gauges are bonded.

(Function)

When a load is exerted on a conventional load cell (flexural element), edge loads are generated at two positions of both ends of the thin section (refer to FIG. 7($a$)). On the other hand, when a nearly circular penetration aperture (hereinafter simply referred to as "aperture") is formed at the center of the thin section in the width direction in the conventional load cell (flexural element), the edge loads are generated in four positions in all including the both ends of the thin section and the peripheral ends of the aperture, and the values of these edge loads are smaller than those generated in the thin section of the conventional load cell.

That is, the two thin sections to which the strain gauges are bonded (thin sections having no apertures) in the load cell (flexural element) of the present invention have the essential characteristics that "edge loads having relatively larger values are generated at both ends of the thin section, and a period of time for balancing and stabilizing the stress of the thin section in the width direction is relatively longer", while the remaining two thin sections through which the nearly circular apertures are formed have the essential characteristics that "although the edge loads are generated in four positions in all including the peripheral end sections of the circular apertures in addition to the both ends of the thin sections, the magnitudes of the respective edge loads are relatively smaller, and the period of time for balancing and stabilizing the stress in the width direction of the thin section is relatively shorter".

Since the load cell (flexural element) is configured to have the Roberval mechanism in which the thin sections function as fulcrum points, all of the four thin sections are automatically adjusted to have nearly the same characteristics. More in detail, the values of the edge loads in the two thin sections having the circular apertures are larger than those of the original characteristics of the thin sections having the apertures by means of the influence of the characteristics of the two thin sections on which the strain gauges are bonded so that the period of time for balancing and stabilizing the stress in the width direction of the thin sections is extended, while the values of the edge loads in the two thin sections on which the strain gauges are bonded (the thin sections having the circular apertures) are smaller than those of the original characteristics of the thin sections having no apertures by means of the influence of the characteristics of the two thin sections having the apertures so that the period of time for balancing and stabilizing the stress in the width direction of the thin sections is reduced.

As a result, at first, the above load cell is less affected, when compared with the conventional load cell (flexural element), by the edge load so that the measurement error is reduced when the strain gauges sense the stress to the extent that the value of the edge load generated in the thin sections of the top side decreases from H1 to H2.

Secondly, the period of time for balancing and stabilizing the stress in the width direction of the thin sections is reduced (the period of time to the start of the measurement is reduced), when compared with the conventional load cell (flexural element), to the extent that the value of the edge loads having the strain gauges become smaller (H2<H1).

The reduction of the period of time for balancing and stabilizing the stress generated in the thin sections to which the strain gauges are bonded (the period of time required before the start of the measurement) can be explained as follows.

That is, the magnitude of the edge load, the rigidity of and the weight of the four thin sections of the load cell fluctuate depending on the existence or the absence of the aperture. For this reason, when a load is exerted on the load cell, each of the thin sections makes a different movement depending on the existence or the absence of the aperture, and a force is produced which unspreads the movements of the thin sections (the movements of the Roberval mechanism) because the movements mutually different interfere with each other. As a result, it can be conjectured that the movements of the thin sections (the movements of the Roberval mechanism) stop so that the period of time for achieving the situation of stabilizing the stress can be reduced.

The thin sections are designed to have the externally linear shape and the internally arc shape horizontally viewed (viewed from the side) such that the maximum stress is generated at the apex of the internal arc, and the apex is the starting point of the Roberval deformation. The stress generated at the apex of the internal arc during the deformation of the thin sections is considered to start the deformation taking the vicinity of the apex as the starting point because the thickness of the vicinity of the apex is nearly the same.

Since the aperture exists at the center in the width direction of the flexural element when the thin section is planarly viewed in the thin sections having the apertures, the maximum stress is generated in a horizontal section having the minimum area, extending horizontally and passing through the center of the aperture, in which the aperture in the thin section is sandwiched by the right and left regions thereof. The horizontally sectional position is coincident with the apex of the internal arc when the thin section is horizontally viewed.

Accordingly, the maximum stress is generated without fail in the horizontal section which is coincident with the apex of the internal arc of the thin section, and the horizontal section surely acts as the starting point of the Roberval deformation. Since each of the apexes of the internal arcs of the two thin sections having the apertures acts as the starting point of the Roberval deformation without fail, the two thin sections on which the strain gauges are bonded (the thin sections having no apertures) also act as the starting points of the Roberval deformation taking each of the apexes of the internal arcs of the thin sections as the starting point for following the two thin sections having the apertures. That is, the correctness and the repeatability of the Roberval deformation are considered to rise compared with the conventional load cell (flexural element) having no circular aperture through all of the thin sections.

The apertures which are formed through the thin sections have been described to be the nearly circular apertures. Although similar performances and effects are obtained to those in case of the nearly circular apertures when the shape of the apertures formed through the thin sections is other than the "nearly circular apertures" such as rectangular apertures, it is desirable to be the "nearly circular apertures" because the formation of the apertures other than the "nearly circular apertures" such as rectangular apertures is hardly processed, and considerable amounts of cost and time are required. The aperture of the nearly circular shape includes an oval aperture extending in the width direction of the flexural element as well as an ellipsoidal aperture.

There are the following four aspects defined in claims 2 to 5 depending on cases where the apertures are formed on which two thin sections out of the four thin sections of the flexure element.

The invention of Claim 2 is configured in that, in the Roberval load cell of Claim 1, each of the strain gauges is bonded to the two thin sections of the top beam while each of the nearly circular apertures is formed through the two thin sections of the bottom beam.

The invention of Claim 3 is configured in that, in the Roberval load cell of Claim 1, each of the strain gauges is bonded to the two thin sections of the bottom beam while each of the nearly circular apertures is formed through the two thin sections of the top beam.

The invention of Claim 4 is configured in that, in the Roberval load cell of Claim 1, each of the strain gauges is bonded to the two thin sections near the fixed portions of the pair of the top and the bottom beams while each of the nearly circular apertures is formed through the two thin sections near the movable portions of the pair of the top and the bottom beams.

The invention of Claim 5 is configured in that, in the Roberval load cell of Claim 1, each of the strain gauges is bonded to the two thin sections near the movable portions of the pair of the top and the bottom beams while each of the nearly circular apertures is formed through the two thin sections near the fixed portions of the pair of the top and the bottom beams.

Effects of Invention

In accordance with the Roberval load cell of the present invention, the load cell can be provided which is excellent in its basic performances such as the measurement error, the period of time required before the start of the measurement, and the correctness and the repeatability of the Roberval deformation.

In the electronic balance in which the Roberval load cell of the present invention is mounted on the body case and externally exposed, and the peripheral regions of the load cell can be washed with water, since the apertures formed through the thin sections of the bottom beam act as drain holes, water hardly remains on the bottom beam of the load cell (flexure element) and water is hardly splashed on the strain gauges during the washing so that the invention of Claim 2 is especially effective.

BRIEF DESCRIPTION OF DRAWINGS

FIG. 6(a) is a plan view of the thin section (a sectional view taken along a line VI-VI of FIG. 5), and FIG. 6(b) is a side view of the thin section.

FIG. 7(a) is a perspective view showing the stress generated in the thin section (thin section having an aperture) of a bottom beam of the above load cell, FIG. 7(b) is a perspective view showing the stress generated in the thin section (the thin section having no aperture) of a top beam of the above load cell, and FIG. 7(c) is a perspective view showing the stress generated in the thin section of the conventional load cell (Comparative Example).

FIG. 8(a) is a sectional view of the measuring apparatus, and FIG. 8(b) is a plan view of the above measuring apparatus showing positions on which off-center loads are exerted.

FIG. 9(a) is the diagram showing the errors at the four corners of the above load cell, and FIG. 9(b) is the diagram showing the errors at the four corners of the conventional load cell (Comparative Example).

EMBODIMENTS FOR IMPLEMENTING INVENTION

Figure 1:
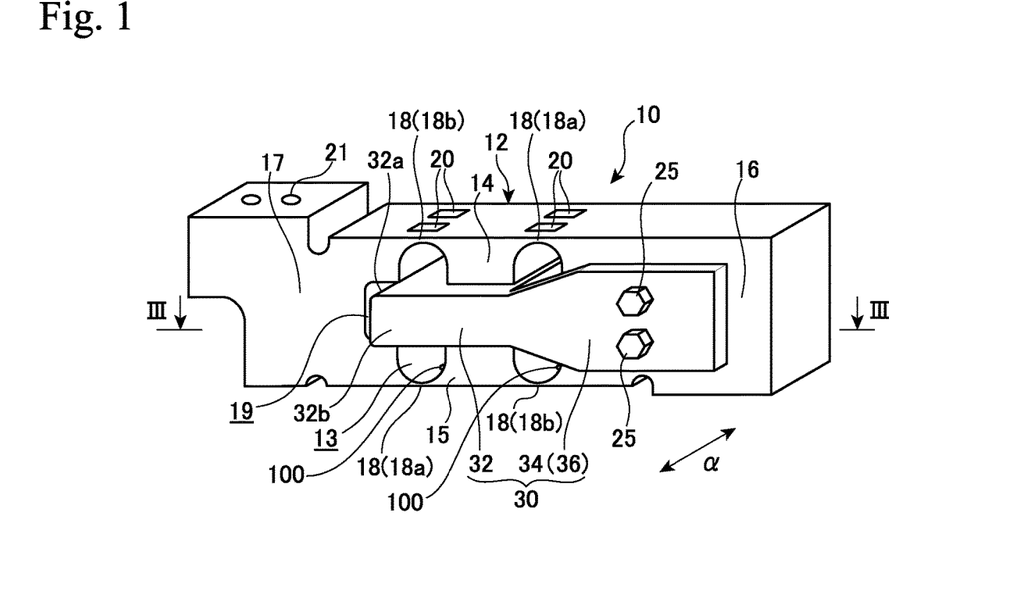
FIG. 1 A perspective view showing a load cell of a first embodiment.
Figure 2:
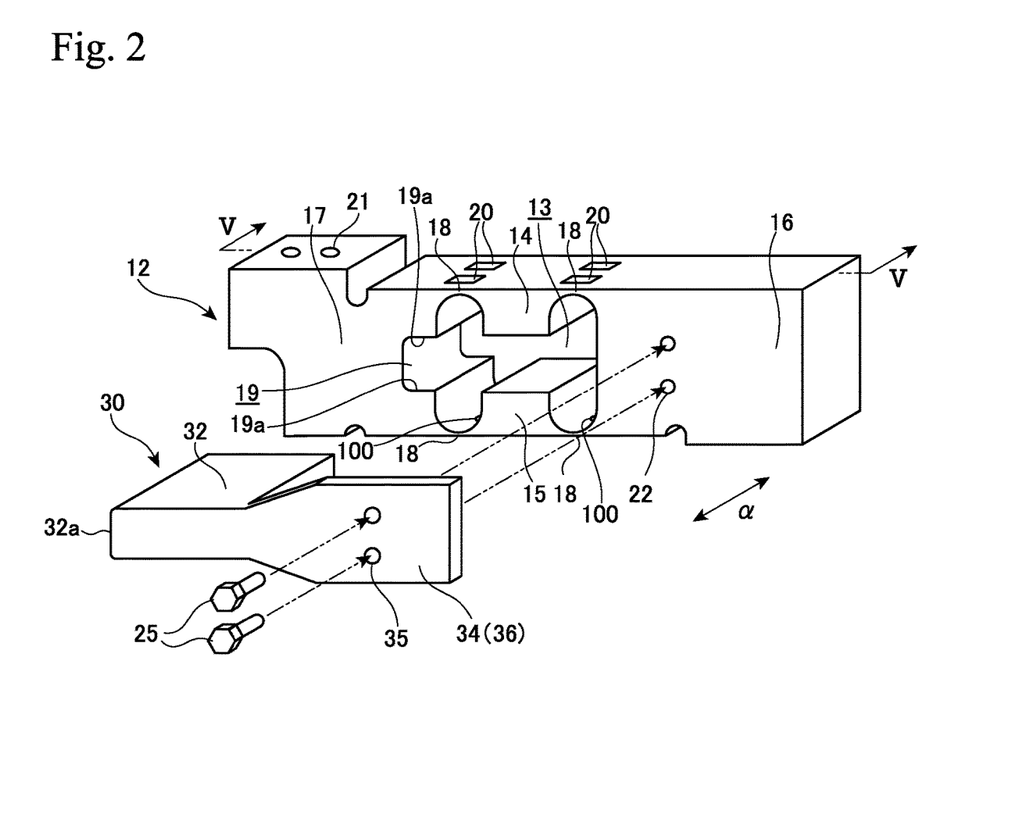
FIG. 2 An exploded perspective view of the load cell of FIG. 1.
Figure 3:
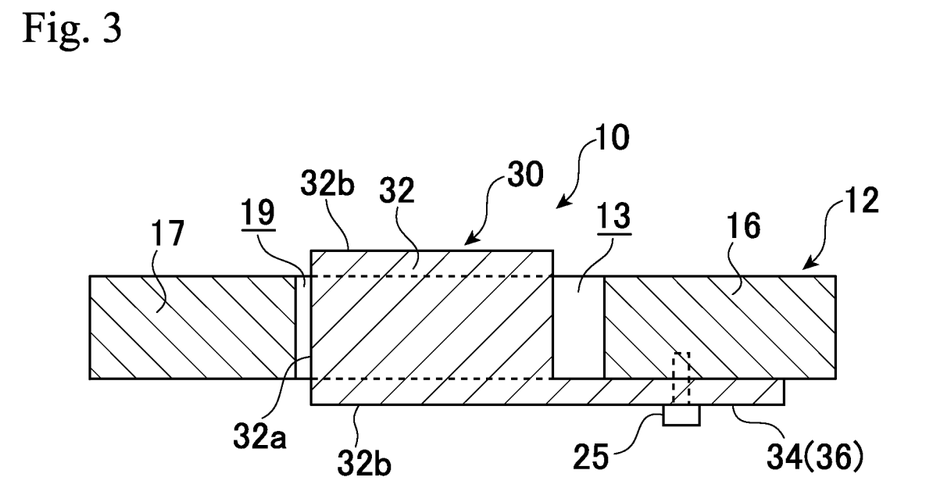
FIG. 3 A sectional view of the load cell taken along a line III-III of FIG. 1.
Figure 4:
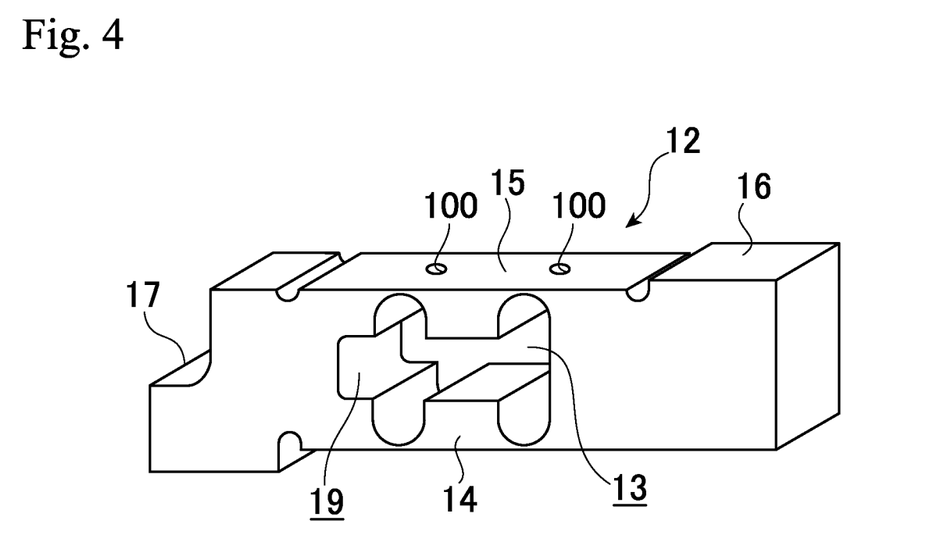
FIG. 4 A perspective view of the above load cell viewed from the bottom side.
Figure 5:
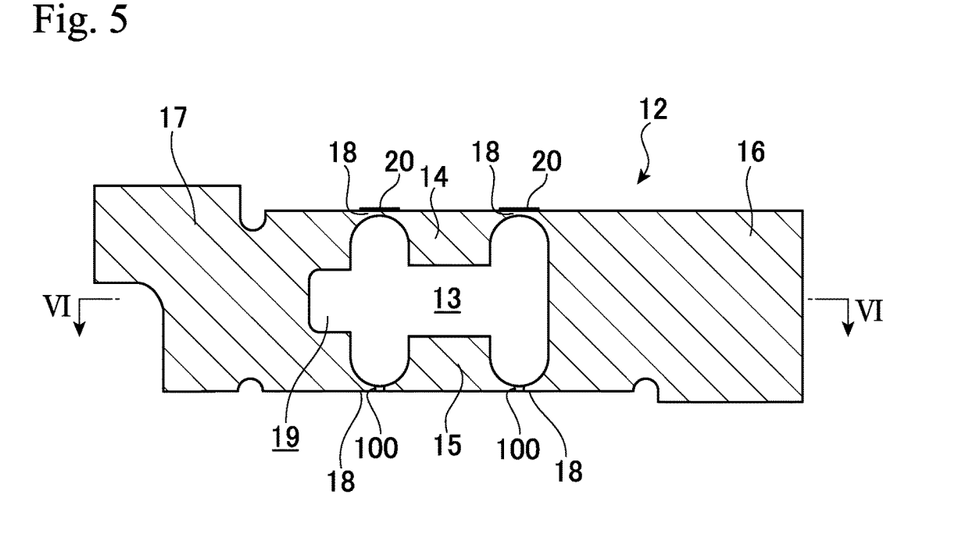
FIG. 5 A vertical sectional view of the above load cell (flexural element) (a sectional view taken along a line V-V of FIG. 2).
Figure 6:
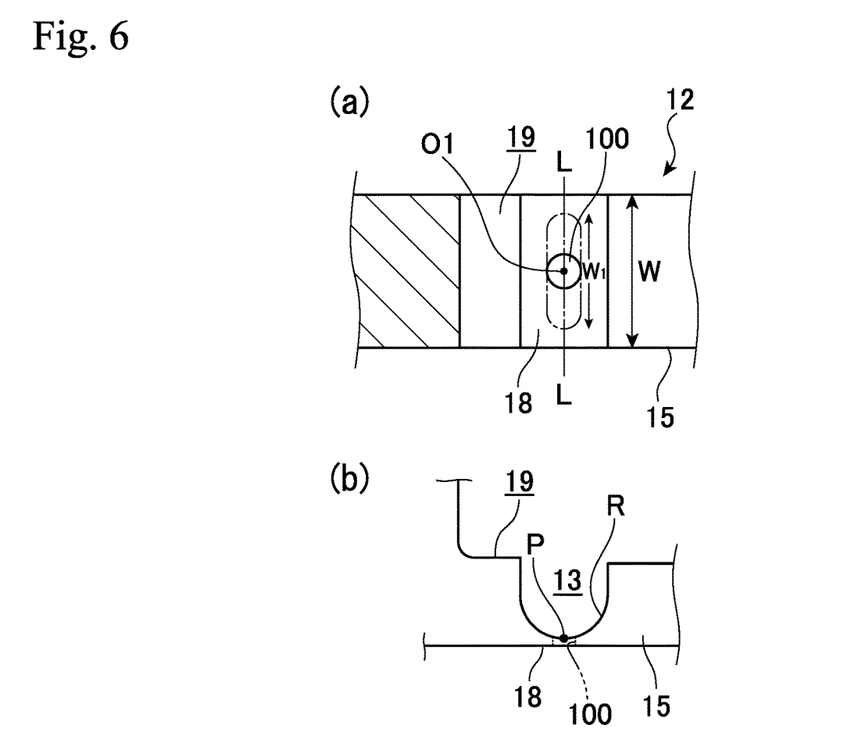
FIG. 6 Enlarged views showing a thin section of the above load cell.

Preferable embodiments of the present invention for the load cell will be described referring to the annexed drawings. FIG. 1 is a perspective view showing a Roberval load cell 10 of a first embodiment to which the present invention is applied, FIG. 2 is an exploded perspective view of the above load cell, FIG. 3 is a horizontal sectional view of the load cell (a sectional view taken along a line III-III of FIG. 1), FIG. 4 is a perspective view of the above load cell viewed from the bottom side, FIG. 5 is a vertical sectional view of the above load cell (a sectional view taken along a line V-V of FIG. 2), and FIG. 6 is enlarged views showing a thin section of the above load cell (flexural element), FIG. 6(a) is a plan view of the thin section (a sectional view taken along a line VI-VI of FIG. 5), and FIG. 6(b) is a side view of the thin section.

As shown in these drawings, the load cell 10 mainly includes a flexural element 12, strain gauges 20 and a stopper 30 for preventing an overload.

The flexure elements 12 is composed of a metal such as aluminum, and is produced, for example, by cutting, with a constant width, the metal having a specified shape prepared by extrusion molding, if necessary, followed by a cutting operation. A penetration aperture 13 in the shape of nearly eyeglasses is formed through the flexural element 12 in the width direction (direction of arrow α). The formation of this penetration aperture 13 provides the flexure element 12 with a Roberval mechanism including a top beam 14 and a bottom beam 15 disposed in parallel, a fixed portion 16 and a movable portion 17 each connecting the both ends of the pair of the top beam 14 and the bottom bean 15, and two thin sections 18 positioned on the top beam 14 and the bottom beam 15 and opposing to each other. A total of the four thin sections 18 are formed, and two thin sections 18 are pulled and the remaining two thin sections 18 are compressed when a load is applied to the movable portion 17 for deforming the flexural element 12.

In FIG. 1, the thin sections of the pulling side are designated by "18a" and the thin sections of the compressing side are designated by "18b". In the present embodiment, two strain gauges 20 are bonded on the thin sections 18 (18a) of the pulling side (right-hand side of the drawings) of the top beam 14, and two strain gauges 20 are bonded on the thin sections 18 (18b) of the compressing side (left-hand side of the drawings) of the top beam 14. The strain gauges 20 arranged in this way constitute a bridge circuit.

On the other hand, the fixed portion 16 is fixed to a main body of an apparatus (not shown) such as a case, and in the present embodiment, screw apertures (not shown) are formed on the bottom surface of the fixed portion 16 which is fixed to the main body of the apparatus by the threadable mounting on the bottom surface. The movable portion 17 is formed at the other side of the fixed portion 16 in the flexural element 12. A weighing dish (not shown) is connected to the movable portion 17 and, in the present embodiment, screw apertures 21 are formed on the top surface of the movable portion 17. A supporting member of the weighing dish (not shown) is fixed by means of threadable mounting from the upper side. A concave portion 19 for engaging with the stopper extending in a width direction of the flexure element 12 is formed on an inner side surface (a side surface facing to the penetration aperture 13) of the movable portion 17. The concave portion 19 includes the constant shape along the width direction of the flexural element 12, and part of the front portion 32 of the stopper 30 is placed in the concave portion 19.

The stopper 30 includes the front portion 32 placed in the concave portion 19 and a base portion 34 fixed to the side surface of the fixed portion of the flexural element 12, and is integrally formed by using the same material (for example, aluminum) with that of the flexural element 12.

The stopper front portion 32 is formed as a shape (for example, a plate shape having specified thickness) disposable inside of the penetration aperture 13 and in non-contact therewith. The front portion 32 is formed broader than the flexure element 12 so that the front portion projects toward outside of the width direction of the movable portion when the stopper is fixed to the flexure element 12 as shown by a symbol 32b in FIG. 3. The front part 32a of the stopper front portion 32 is disposed in the concave portion 19 of the movable portion 17 in the no-contact manner. The front portion 32 having the parallel and flat top and bottom surfaces creates a clearance between the top and bottom surfaces of the concave portion 19 when placed in the concave portion 19.

The stopper base portion 34 includes a plate-shaped side plate portion 36 with a broader width which is in surface-contact with the outer side surface of the fixed portion 16 of the flexure element 12, and is connected to the one end of the stopper front portion 32 in the width direction. Accordingly, as shown in FIG. 3, the stopper 30 includes an L-shaped horizontal section as a whole. As shown in FIG. 2, the side plate portion 36 has a larger width (vertical dimension) along the vertical direction than the thickness of the front portion 32 and includes two insertion apertures 35 for screws 25 in the two upper and lower positions. Screw apertures 22 are provided in the outer side surface of the fixed portion 16 in conformity with the insertion apertures 35.

The front portion 32 of the stopper 30 having such configuration is inserted into the penetration aperture 13 of the flexure element 12 and the front part 32a of the front portion 32 is placed in the concave portion 19 of the movable portion 17 so that the side plate portion 36 is in surface-contact with the outer side surface of the fixed portion 16. At this stage, the right and left side peripheral sections 32b of the front portion 32 of the stopper 30 project toward the both sides of the movable portion 17 of the flexure element 12 because the front portion 32 of the stopper 30 is formed broader than the flexure element 12. Then, after a jig for position determination (not shown) is touched to the peripheral sections 32b acting as the projecting portions (refer to FIG. 3) for adjusting the clearances between the front portion 32 and the top and bottom surfaces of the concave portion 19, the screws 25 are inserted into the insertion apertures 35 and fastened to the screw apertures 22 while the situation is maintained. Thereby, the stopper 30 is fixed while its position is determined with respect to (the concave portion 19 of) the flexure element 12.

Then, the performance of the stopper 30 will be described.

As shown by the symbol 32b of FIG. 3, the right and left side peripheral sections 32b of the front portion 32 of the stopper 30 project toward the both sides of the movable portion 17 in the load cell 10 because the front portion 32 of the stopper 30 is formed broader than the movable portion 17 of the flexure element 12. When an overload of the vertical direction is exerted on the movable portion 17 of the load cell 10, the bottom surface or the top surface of the concave portion 19 of the movable portion 17 is in contact with the top surface or the bottom surface of the front portion 32 of the stopper 30 so that the transmission of the overload to the flexure element 12 is prevented for suppressing the excessive deformation of the thin portions 18.

When an overload in a torsion direction is exerted on the movable portion 17 of the load cell 10, an end portion (edge portion) 19a in the extending direction of the concave portion 19 which is an end in the width direction of the flexure element 12 deforms in a maximum level, and the maximum load is delivered to a position where the edge portion 19a is in contact with the stopper front portion 32. At a position where the top and bottom of the edge portions 19a oppose to each other, the front portion 32 of the stopper has a certain surface area. That is, at a position where the top and bottom of the edge portions 19a oppose to each other, a planar region of the front portion 32 of the stopper extends. Accordingly, when the overload in the torsion direction is exerted on the flexure element 12, the edge portion 19a is in contact with (the planar region of) the front portion 32 of the stopper 30 without fail so that the excessive overload more than a specified value is not delivered to the flexure element 12, and the excessive deformation of the thin portions 18 can be suppressed.

In this manner, the load cell of the present embodiment is effective for suppressing the excessive deformation of the thin portions not only with respect to the overload in the vertical direction but also to the overload in the torsion direction.

The formation of a circular aperture 100 vertically penetrating the thin section 18 in the center in the width direction of the flexural element 12 through the thin sections 18 (18a, 18b) of the bottom beam 15 reduces the magnitude of the edge load generated in each of the thin sections 18 of the load cell 10, thereby improving the performances of the load cell 10 such as a measurement error and a period of time required for stabilizing the measured value.

That is, as described above, while the respective two strain gauges 20 are bonded on the thin sections 18 (18a) of the pulling side and on the thin sections 18 (18b) of the compressing side of the top beam 14, the circular apertures 100 are formed through the thin sections 18 (18a) of the pulling side and on the thin sections 18 (18b) of the compressing side of the top beam 14, on which no strain gauges are bonded.

The mechanism of improving the performances of the load cell by forming the circular apertures 100 through the thin sections 18 (18a, 18b) of the bottom beam 15 will be explained.

The two thin sections 18 (the thin sections having no circular apertures 100) of the top side on which the strain gauges 20 are bonded out of the four thin sections 18 of the load cell (flexural element) have essential characteristics that "the edge load having a relatively larger value is generated in the both ends of the thin sections 18 as shown by the symbol H1 in FIG. 7(c), and the period of time for balancing and stabilizing the stress in the width direction of the thin sections 18 is relatively longer". On the other hand, the two thin sections 18 having the circular apertures 100 of the bottom side have essential characteristics that "although the edge loads are generated in four positions in all including the peripheral end sections of the circular apertures in addition to the both ends of the thin sections 18, the magnitudes of the respective edge loads are smaller than the edge loads generated in the thin sections 18 of the top side such that the period of time for balancing and stabilizing the stress in the width direction of the thin sections 18 is relatively shorter".

Since the load cell 10 (flexural element 12) is configured to have the Roberval mechanism in which the thin sections function as fulcrum points, all of the four thin sections 18 are automatically adjusted to have nearly the same characteristics. More in detail, the values of the edge loads in the two thin sections 18 having the circular apertures 100 are larger than those of the original characteristics of the thin sections 18 having the apertures 100 by means of the influence of the characteristics of the two thin sections 18 on which the strain gauges 20 are bonded (the thin sections 18 having no apertures 100) so that the period of time for balancing and stabilizing the stress in the width direction of the thin sections 18 is extended, while the values of the edge loads in the two thin sections 18 on which the strain gauges 20 are bonded (the thin sections having the circular apertures 100) are smaller than those of the original characteristics of the thin sections 18 having no apertures 100 by means of the influence of the characteristics of the two thin sections 18 having the apertures 100 so that the period of time for balancing and stabilizing the stress in the width direction of the thin sections 18 is reduced.

More in detail, as shown by the symbol H2 of FIG. 7(b), the value of the edge load is smaller than that of the essential characteristics (refer to the symbol H1 of FIG. 7(c)) (H2<H1) so that the period of time for balancing and stabilizing the stress in the width direction of the thin sections is reduced because the essential characteristics of the two positions of the thin sections 18 of the top side on which the strain gauges are bonded (the value of the edge load is relatively larger, and the period of time for stabilizing the stress in the width direction of the thin sections is relatively longer) and the essential characteristics of the two positions of the thin sections 18 of the bottom side having the apertures 100 (the value of the edge load is relatively smaller, and the period of time for stabilizing the stress in the width direction of the thin sections is relatively shorter) are influenced by each other.

That is, at first, the above load cell is less affected, when compared with the conventional load cell (flexural element), by the edge load so that the measurement error is reduced when the strain gauges 20 sense the stress to the extent that the value of the edge load generated in the thin sections 18 of the top side decreases from H1 to H2.

Secondly, the period of time for balancing and stabilizing the stress in the width direction of the thin sections in connection with the edge load generated in the thin sections 18 of the top side is reduced, when compared with the conventional load cell (flexural element) to the extent that the value H2 of the respective edge loads become smaller (H2<H1).

The reduction of the period of time for balancing and stabilizing the stress generated in the thin sections 18 (the period of time required before the start of the measurement) can be explained as follows.

That is, the magnitude of the edge load, the rigidity of and the weight of the four thin sections 18 of the load cell 10 fluctuate depending on the existence or the absence of the circular aperture 100. For this reason, when a load is exerted on the load cell 10, each of the thin sections 18 makes a different movement depending on the existence or the absence of the circular aperture 100, and a force is produced which unspreads the movements of the thin sections 18 (the movements of the Roberval mechanism) because the movements mutually different interfere with each other. As a result, it can be conjectured that the movements of the thin sections 18 (the movements of the Roberval mechanism) stop so that the period of time for achieving the situation of stabilizing the stress can be reduced.

The thin sections 18 are designed to have the externally linear shape and the internally arc shape horizontally viewed (viewed from the side) such that the maximum stress is generated at the apex (P) of the internal arc (R), and the apex is the starting point of the Roberval deformation. The stress generated at the apex (P) of the internal arc (R) during the deformation of the thin sections 18 is considered to start the Roberval deformation taking the vicinity of the apex (P) as the starting point because the thickness of the vicinity of the apex (P) is nearly the same.

Since, as shown in FIG. 6(a), the circular aperture 100 exists at the center in the width direction of the flexural element 12 when the thin section 18 is planarly viewed, the maximum stress is generated in a horizontal section (the section designated with a symbol L-L) having the minimum area, extending horizontally and passing through the center O1 of the circular aperture 100, in which the circular aperture 100 in the thin section 18 is sandwiched by the right and left regions thereof. The horizontally sectional position L-L is coincident with the apex (P) of the internal arc (R) of the thin section 18 when it is horizontally viewed (viewed from the side).

Accordingly, the maximum stress is generated without fail in the horizontal section which is coincident with the apex (P) of the internal arc (R) of the thin section 18, and the horizontal section surely acts as the starting point of the Roberval deformation. Since each of the apexes (P) of the internal arcs (R) of the two thin sections 18 of the bottom side acts as the starting point of the Roberval deformation without fail, the two thin sections 18 of the top side also act as the starting points of the Roberval deformation taking each of the apexes (P) of the internal arcs (R) of the thin sections 18 as the starting point for following the two thin sections 18 of the bottom side. That is, the correctness and the repeatability of the Roberval deformation are considered to rise compared with a conventional load cell (flexural element) having no circular aperture through the thin section.

Figure 8:
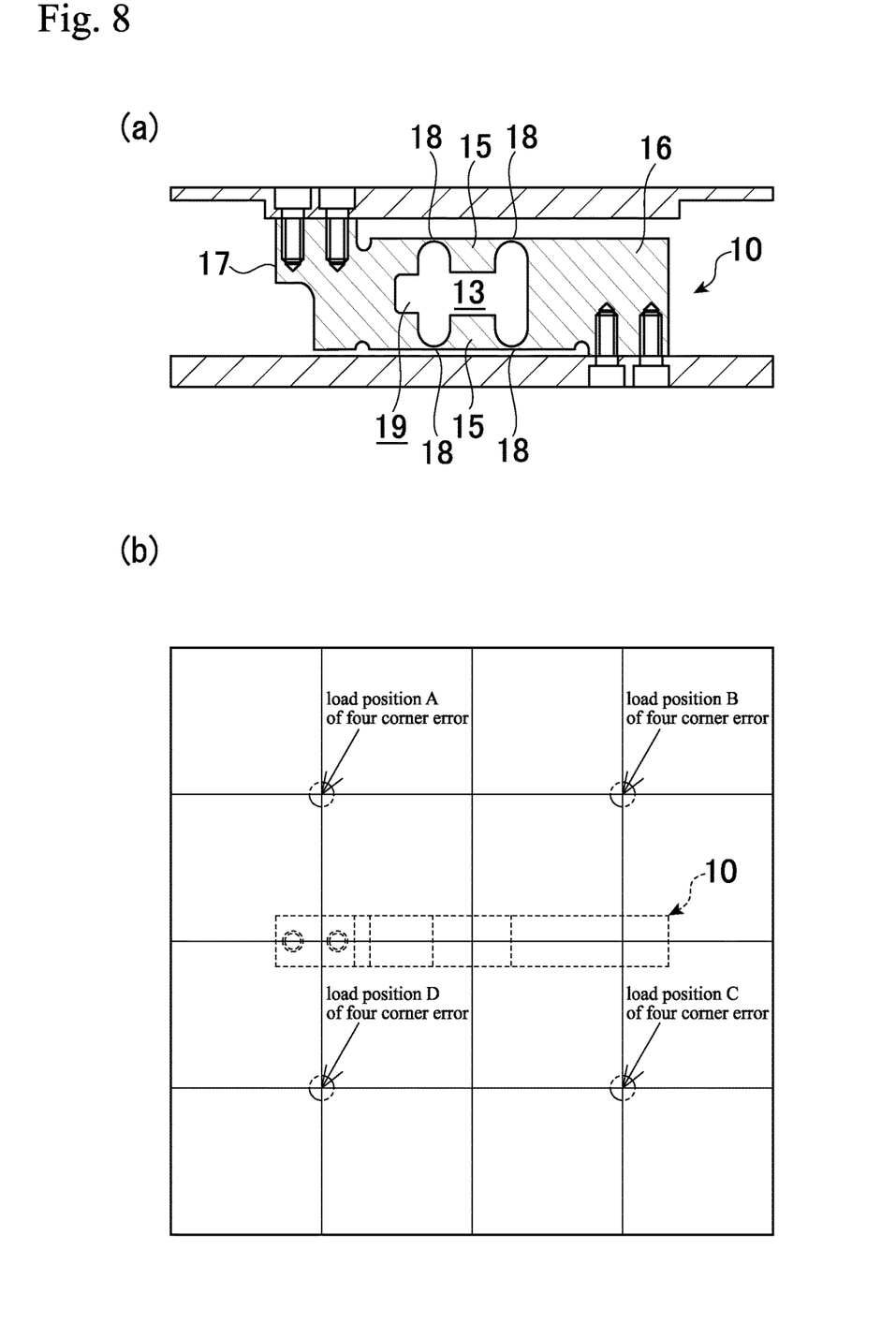
FIG. 8 Views showing an apparatus of measuring an error at four corners which incorporates the above load cell.
Figure 9:
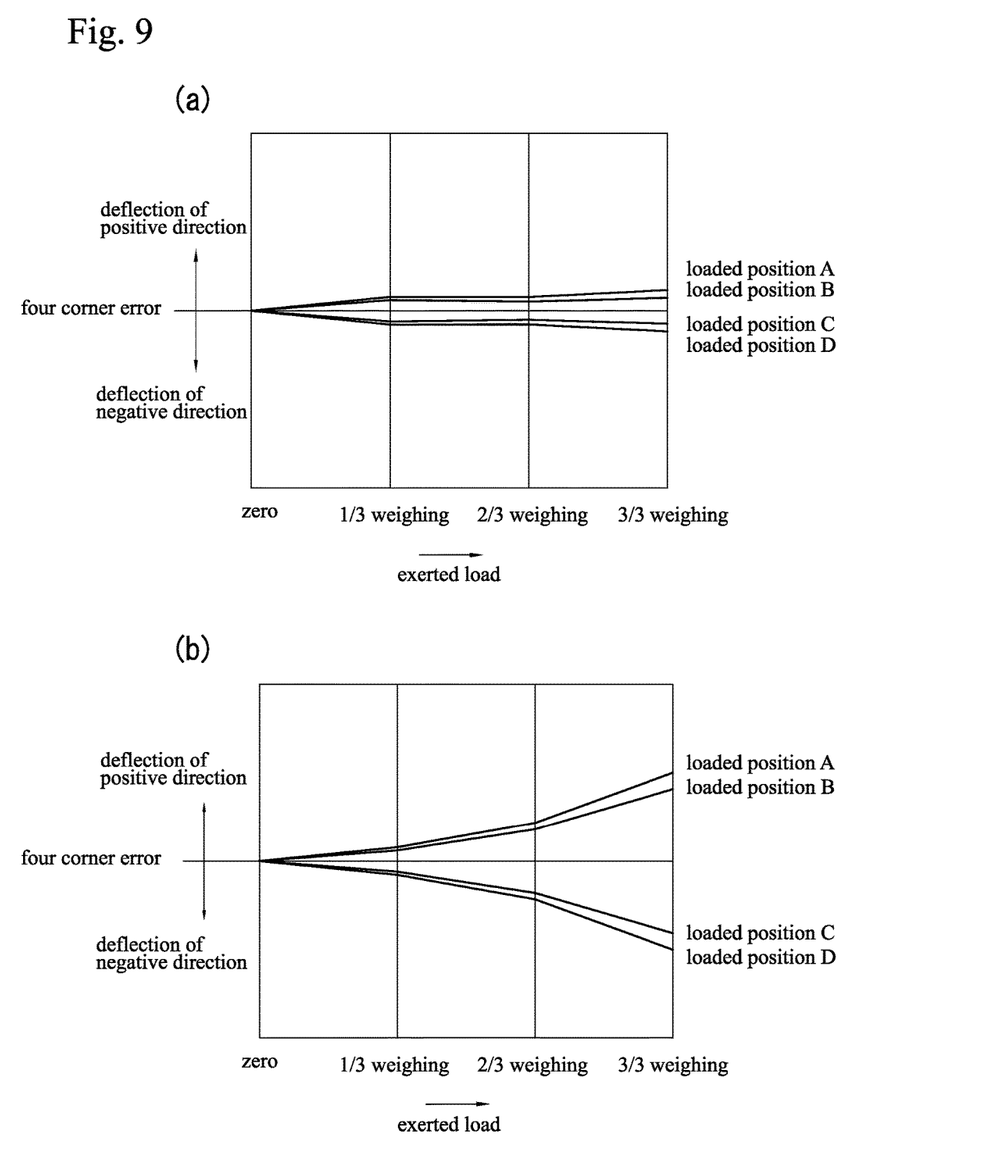
FIG. 9 Diagrams for comparing the errors at the four corners of the above load cell with the errors at the four corners of the conventional load cell (Comparative Example)

FIG. 8 is views showing an apparatus of measuring an error at four corners which incorporates the load cell of the first embodiment, FIG. 8(a) is a sectional view of the measuring apparatus, and FIG. 8(b) is a plan view of the above measuring apparatus showing positions on which off-center loads are exerted. FIG. 9 is diagrams for comparing the errors at the four corners of the above load cell with the errors at the four corners of a conventional load cell (Comparative Example), FIG. 9(a) shows the errors at the four corners of the above load cell 10, and FIG. 9(b) shows the errors at the four corners of the conventional load cell (Comparative Example).

In these drawings, the measuring apparatus includes a structure, as shown in FIG. 8(a), in which the fixed portion 16 of the load cell 10 is fixed to a base plate and horizontally disposed in a cantilever manner, and a weighing dish which is square in a plan view is fixed to the movable portion 17 of the load cell 10, and is configured to measure each of "deflection values" by the load cell 10 taking, as a standard, a value which is obtained by exerting the load on the center of the weighing dish, when loads are exerted on four positions designated with symbols "A", "B", "C" and "D", as shown in FIG. 8(b).

In the conventional load cell, as shown in FIG. 9(b), the deflection values increase in each of the positive and the negative directions nearly bi-dimensionally with the increase of the load. On the other hand, in the load cell of the present embodiment, as shown in FIG. 9(a), the ratio of the increase of the deflection values in the positive and the negative directions is smaller with the increase of the load, when compared with that of the conventional load cell. Especially, the deflection values before "1/3 weighing" in the present embodiment are similar to those of the conventional load cell, and while the deflection values rapidly increase in both of the positive and the negative directions in the conventional load cell with the sequential increase of the deflection values to "2/3 weighing" and "3/3 weighing", the deflection values of the load cell 10 of the present embodiment remain in slight increase.

That is, the errors at the four corners of the load cell 10 of the present embodiment, when the off-center loads are exerted, are decisively smaller than those of the conventional load cell.

The decrease of the errors at the four corners of the load cell 10 of the present embodiment with respect to the conventional load cell, when the off-center loads are exerted, can be explained as follows.

The load cell 10 (flexural element 12) rotates around a virtual and neutral shaft extending back and forth in the width direction at the center of the load cell 10 when the off-center loads are exerted. In the conventional load cell, the position of the virtual and neutral shaft is determined only in the vicinity of the center of the load cell 10 (flexural element 12) in the width direction, and the above position is not apparently determined. Further, the stress around the center is affected by the edge load generated at the both ends in the width direction of the thin section to produce a measurement error, and the measurement values are stabilized only after the stress in the thin section in the width direction is balanced and stabilized (a specified period of time is required for stabilizing the measurement values when off-center loads are exerted).

In the load cell 10 (flexural element 12), by forming the circular apertures 100 through each of the centers of the two thin sections 18 (18a, 18b) of the bottom side extending back and forth, the position of the virtual and neutral shaft which extends back and forth, acts as a torsional rotation center, and is not heretofore apparent in the conventional load cell is correctly determined at the center of the load cell 10 (flexural element 12) in the width direction so that the correctness and the repeatability of the torsional rotation of the load cell 10 (flexural element 12) during the exertion of the off-center loads seems increased and the measurement errors seems decreased.

Figure 10:
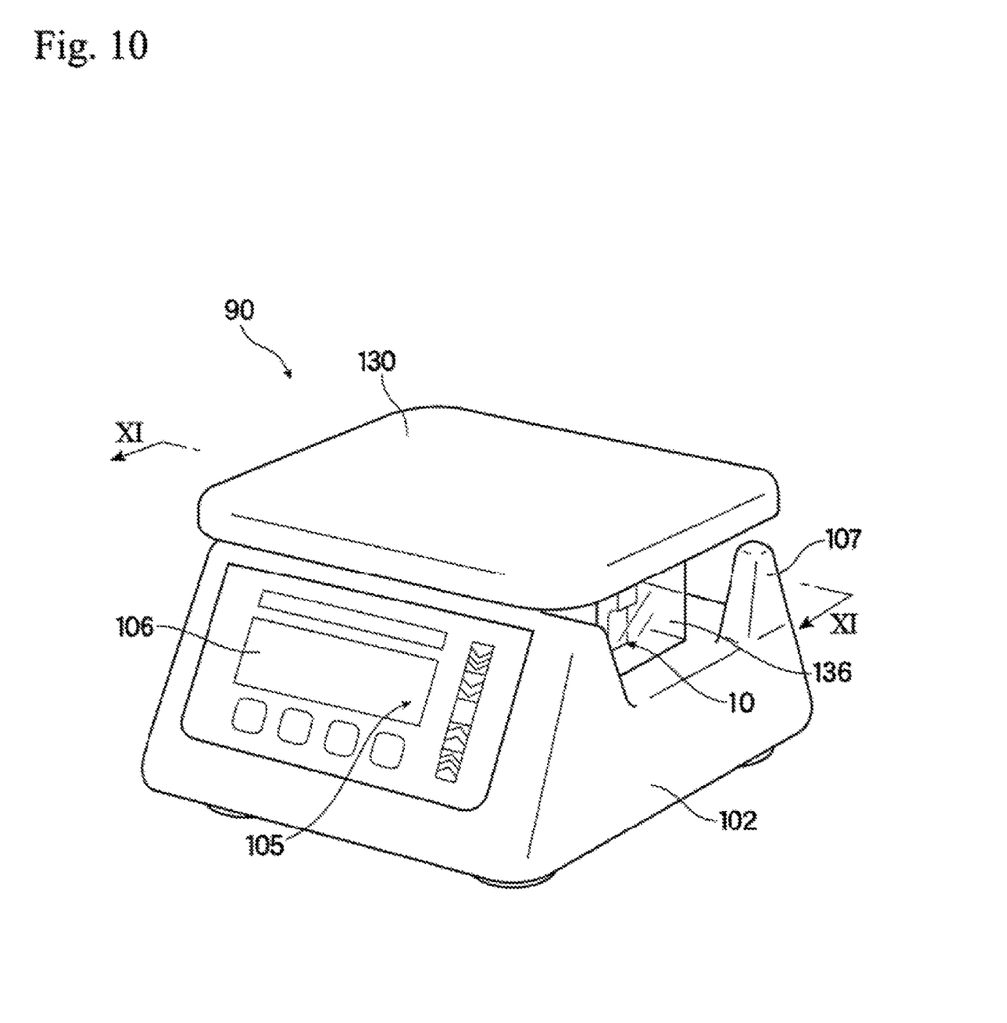
FIG. 10 A perspective view of an electronic balance incorporating the load cell of the first embodiment.
Figure 11:
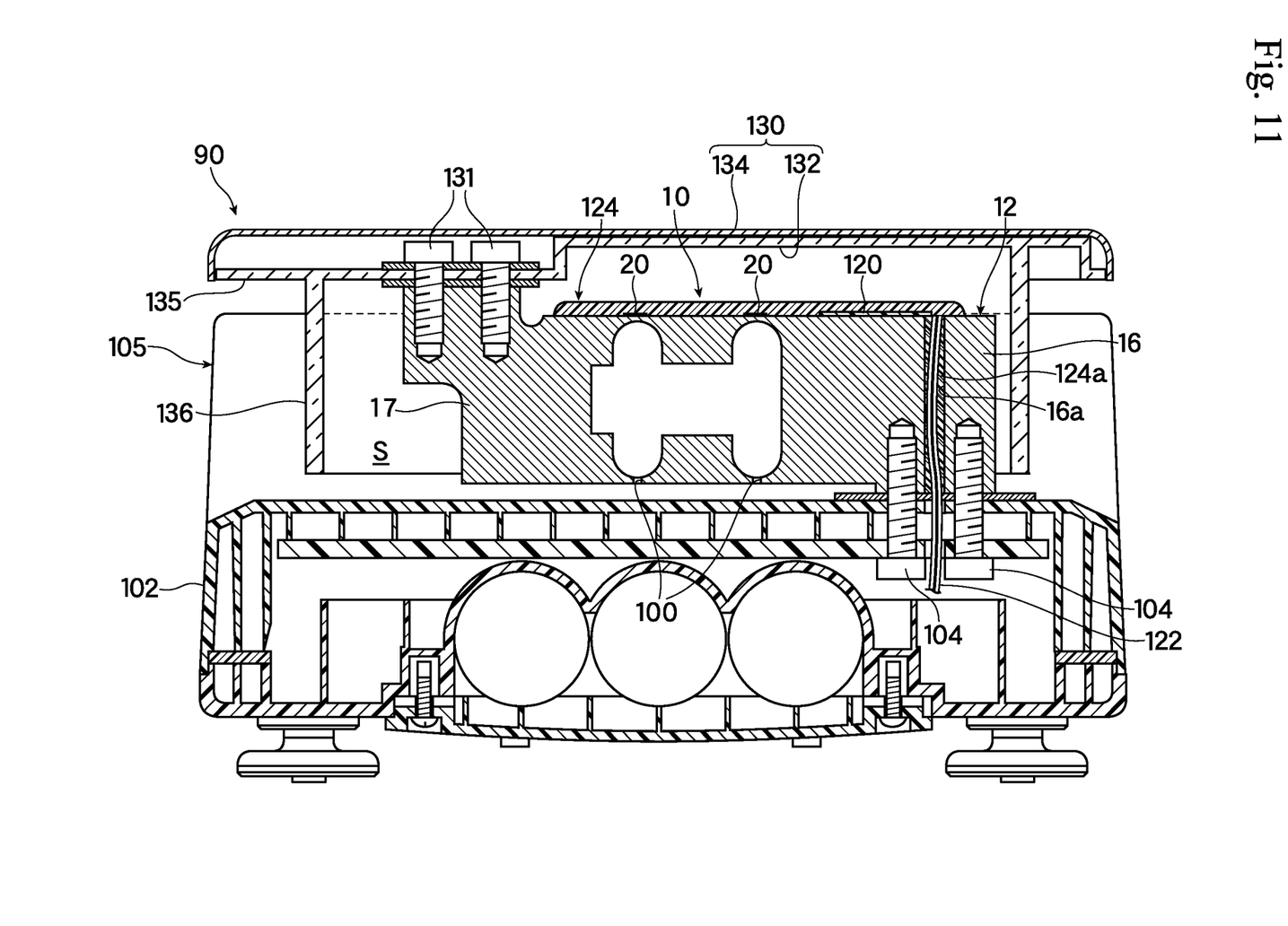
FIG. 11 A vertical sectional view of the above electronic balance (a sectional view taken along a line XI-XI of FIG. 10).

FIGS. 10 and 11 show an electronic balance incorporating the load cell 10 of the first embodiment, FIG. 10 is a perspective view of the electronic balance, and FIG. 11 is a vertical sectional view of the above electronic balance (a sectional view taken along a line XI-XI of FIG. 10).

(a) An electronic balance 90 includes the load cell 10 horizontally disposed in a cantilever manner in which its fixed portion 16 is fixed on the top surface of a balance body case 102 made of plastics in the shape of nearly rectangular in the planar view, a weighing dish 130 connected to the movable portion 17 of the load cell 10, and an electronic circuit board (not shown) which conducts the operational treatment of outputs detected in the load cell 10 and is arranged in a hollow-walled display section 105 integrated with the balance body case 102. A symbol 131 designates fixation screws for fixing the weighing dish 130 (dish body 132) to the movable portion 17 of the load cell 10, and symbols 104 designate fixation screws for fixing the fixed portion 16 of the load cell 10 to the top wall of the balance body case 102. The stopper 30 for preventing the overload is not shown in FIG. 11.

A vertical penetration aperture 16a for inserting an electric wiring for connecting the load cell 10 with the electronic circuit board is formed through the fixed portion 16 of the load cell 10 (flexural element 12), and the vertical penetration aperture 16a communicates with the interior of the balance body case 102.

That is, in addition to the bonding of the strain gauges 20 on the top surfaces of the top thin section 18, 18 of the load cell 10 (flexural element 12), a flexible printed circuit board 120 constituting the bridge circuit of a resistance for output compensation which is electrically connected to the strain gauges 20 is bonded to the top surface of the fixed portion 16.

An electric wiring 122 derived out from the flexible printed circuit board 120 penetrates the vertical penetration aperture 16a, is derived to the interior of the balance body case 102 and is connected to an electronic circuit board (not shown) in a hollow display section 105 integrated with the balance body case 102.

A silicon insulation coating 124 which covers electrical components (the strain gauges 20 and the flexible printed circuit board 120) and the electric wiring 122 is formed on the top surface of the load cell 10 (flexural element 12), thereby securing the insulation and the water-proof at the electrically conducing sections of these electrical components.

Further, the interior of the balance body case 102 is sealed without fail by filling a silicon material 124a acting as a sealing means in the vertical penetration aperture 16a.

The hollow and wall-shaped display section 105 extending along one side surface of the load cell 10 on the front side of the balance body case 102 is formed integrally with the above balance body case 102. A liquid crystal display 106 is formed on the front side of the hollow display section 105, and an electronic circuit board (not shown) is disposed on the rear side of the liquid crystal display 106 in the display section 105 for controlling data displayed on the liquid crystal display 106 in addition for conducting the operational treatment of the outputs detected in the load cell 10.

On the other hand, a pair of right and left hollow projections 107 are formed at the corners of the rear side of the balance body case 102 such that the projections keep the same height as that of the hollow display section 105, and a load cell accommodation chamber "S" is formed which is surrounded by the display section 105 and the pair of the right and left hollow projections 107, 107 on the top surface of the balance body case 102. The outer side surfaces of the hollow projections 107 are aligned with the outer side surface of the balance body case 102 such that the external design viewed from the side and the rear of the electronic balance 90 is made uniform.

The weighing dish on which a subject to be measured is disposed includes the dish body 132 made of transparent synthetic resin connected to the movable portion 17 of the load cell 10, and a dish cover 132 made of synthetic resin which covers the top surface of the dish body 132. The dish body 132 includes a stepped and plate-shaped top board 135 and a cylindrical transparent cover 136 integrally formed. The top board 135 is connected to the top surface of the movable portion 17 of the load cell 10. The top board 135 is formed in nearly the same shape as that of the dish cover 134, and the dish cover 134 is detachably adapted on the dish body 132 (top board 135).

The transparent cover 136 is formed in a dimension so as to surround the load cell 10 disposed in the space of the load cell accommodation chamber "S" while a margin is maintained. The bottom end of the transparent cover 136 is disposed above the balance body case 102, and the transparent cover 136 is disposed with a specified clearance with respect to the top surface of the balance body case 102.

When the space of the load cell accommodation chamber "S" becomes dirty, the dirt on the periphery of the load cell 10 can be easily washed out, depending on necessity, by removing the transparent cover 136 together with the weighing dish 130 (dish body 132) for opening the entire space of the accommodation chamber "S" because the dirt can be externally and visually recognized through the transparent cover 136.

While the circular apertures 100 are formed through each of the two thin sections 18 of the bottom beam 15, water drops are hardly left on the positions of the penetration apertures 13 of the thin sections 18 when the accommodation space "S" is washed with water because the above circular apertures 100 act as discharging apertures for washing water.

A risk such as wetting of the strain gauges 20 and the flexible printed circuit board 120 which require water proof does not exist when the periphery of the load cell 10 is washed because the above gauges and the circuit board are disposed on the top surface of the load cell 10 (flexural element 12).

Figure 12:
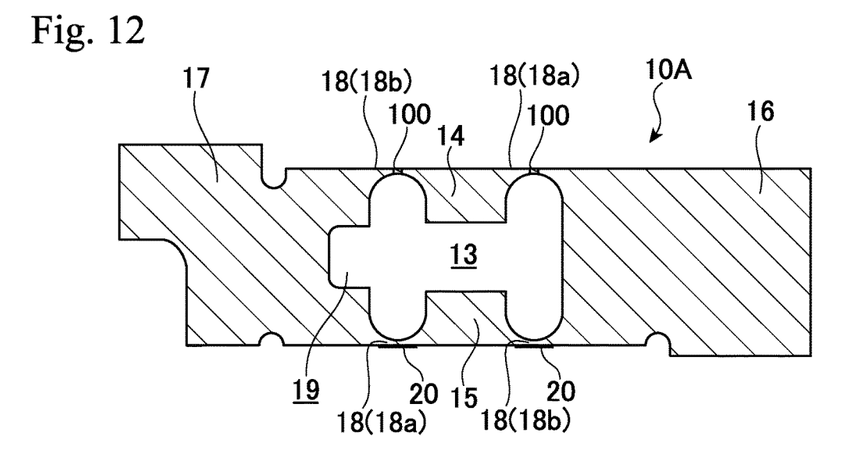
FIG. 12 A vertical sectional view of a load cell of a second embodiment.

FIG. 12 is a vertical sectional view of a load cell of a second embodiment corresponding to claim 3.

In a load cell 10A of the second embodiment, the strain gauges 20 are bonded to each of the two thin sections 18

(18a, 18b) of the bottom beam 15, and the circular apertures 100 are formed through the two thin sections 18 (18a, 18b) of the top beam 14 at the center of the width direction of the flexural element 12.

Since the other structures are the same as those of the load cell 10 of the first embodiment, the description of the components having similar configurations and performances will be omitted by attaching the same symbols thereto.

Figure 13:
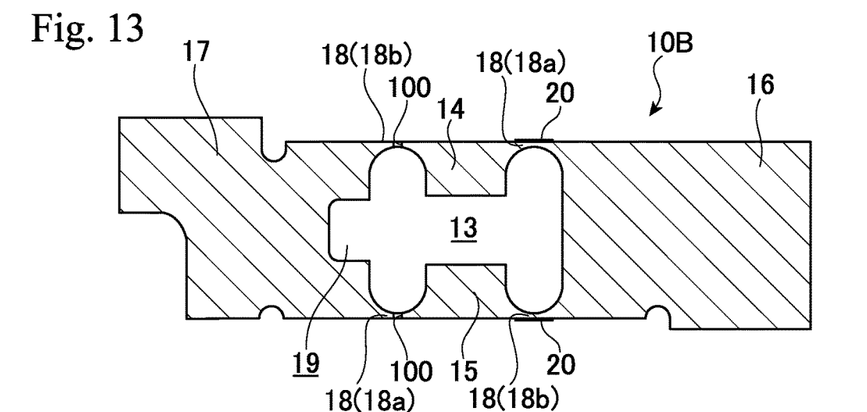
FIG. 13 A vertical sectional view of a load cell of a third embodiment.

FIG. 13 is a vertical sectional view of a load cell of a third embodiment corresponding to claim 4.

In the load cell 10B of the third embodiment, the strain gauges 20 are bonded to each of the two thin sections 18 (18a, 18b) near the fixed portion 16 of the pair of the top and the bottom beams 14, 15, and the circular apertures 100 are formed through the thin sections 18 (18a, 18b) near the movable section 17 of the pair of the top and the bottom beams 14, 15 at the center in the width direction of the flexural element 12.

Since the other structures are the same as those of the load cell 10 of the first embodiment, the description of the components having similar configurations and performances will be omitted by attaching the same symbols thereto.

Figure 14:
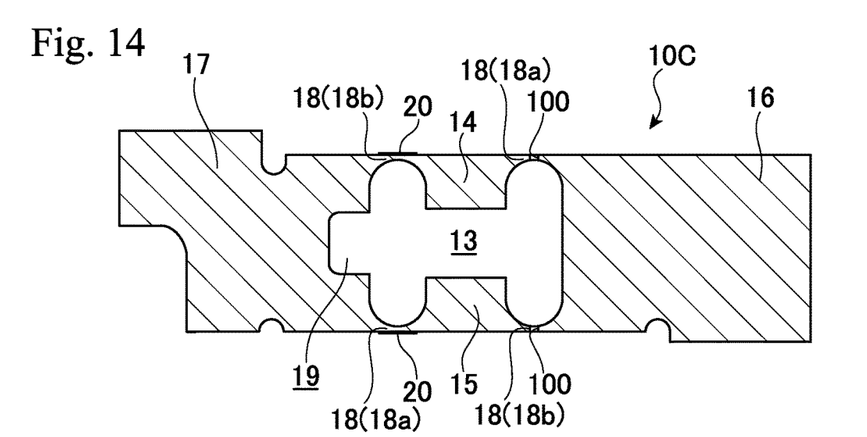
FIG. 14 A vertical sectional view of a load cell of a fourth embodiment.

FIG. 14 is a vertical sectional view of a load cell of a fourth embodiment corresponding to claim 5.

In the load cell 10C of the fourth embodiment, the strain gauges 20 are bonded to each of the thin sections 18 (18a, 18b) near the movable portion 17 of the pair of the top and the bottom beams 14, 15, and the circular apertures 100 are formed through the thin sections 18 (18a, 18b) near the fixed portion 16 of the pair of the top and the bottom beams 14, 15 at the center in the width direction of the flexural element 12.

Since the other structures are the same as those of the load cell 10 of the first embodiment, the description of the components having similar configurations and performances will be omitted by attaching the same symbols thereto.

Although the apertures 100 through the thin sections 18 have been described to be the circular aperture in the first to fourth embodiments, the apertures may be "nearly circular apertures such as ellipsoidal apertures.

Although similar performances and effects are obtained to those in case of the circular apertures when the shape of the apertures 100 formed through the thin sections 18 is other than the "nearly circular apertures such as rectangular apertures, it is desirable to form the "nearly circular apertures" because the formation of the apertures other than the "nearly circular apertures" such as rectangular apertures is hardly processed, and considerable amounts of cost and time are required.

As shown in FIG. 6(a), a length W1 in the width direction of the nearly circular apertures such as the circular apertures 100 formed through the thin sections 18 may be a dimension such that the value of the edge load generated in the thin sections 18 to which the strain gauges 20 are bonded decreases for guaranteeing the proper performances as the Roberval mechanism of the load cell 10 (flexural element 12). For example, the length W1 is desirably in a range between about 0.1 W and about 0.8 W with respect the width W of the flexural element 12.

When the length W1 in the width direction of the nearly circular apertures is below about 0.1 W, the apertures are so small that not the edge load but an excessive stress due to the stress concentration is generated on the peripheral ends of the apertures, and the Roberval mechanism is not established. On the other hand, the length W1 exceeds about 0.8 W, the distance between the peripheral ends of the apertures and the right and lefts ends of the thin sections is so small that the edge loads closely generated are overlapped to produce the excessive stress due to the stress concentration in the thin sections, and the Roberval mechanism is not established.

The thickness of the thin sections 18 through which the apertures are formed may be thicker than that of the thin sections bonded to the strain gauges 20 (thin sections having no nearly circular apertures) for supplementing the strength of the thin sections.

DESCRIPTION OF SYMBOLS 10, 10A, 10B, 10C load cell
12 flexural element
13 penetration aperture
14 top beam
15 bottom beam
16 fixed portion
17 movable portion
18 thin portion
18a thin section of pulling side
18b thin section of compressing side
19 concave portion
19a edge portion of concave portion
20 strain gauge
30 stopper for preventing overload
32 front portion of stopper
90 electronic balance
100 circular aperture

The invention claimed is:

1. A Roberval load cell comprising:
a flexural element in which a Roberval mechanism is formed by a pair of top and bottom parallel beams each including two thin sections at a back and a front in a longitudinal direction, which are integrated with a fixed portion and a movable portion, and strain gauges bonded to the thin sections;
wherein each of the thin sections is formed to have a constant thickness in an entire region in a width direction of the flexural element by a horizontal penetration-aperture in an eyeglass-like shape formed through the flexural element,
wherein, when a downward load is exerted on the movable portion, compressing stresses act on the thin section near the movable portion of the top beam and on the thin section near the fixed portion of the bottom beam out of four thin sections, and pulling stresses act on the thin section near the fixed portion of the top beam and on the thin section near the movable portion of the bottom beam out of the four thin sections, and
the strain gauges are bonded to either of the two thin sections on which the pulling stresses act and to either of the two thin sections on which the compressing stresses act, and nearly circular vertical penetration-apertures are formed through centers in a width direction of the two remaining thin sections on which no strain gauges are bonded,
wherein the penetration-apertures penetrate through the thin sections.

2. The Roberval load cell as claimed in claim 1,
wherein each of the strain gauges is bonded to the two thin sections of the top beam while each of the nearly circular vertical penetration-apertures is formed through the two thin sections of the bottom beam.

3. The Roberval load cell as claimed in claim 1, wherein each of the strain gauges is bonded to the two thin sections of the bottom beam while each of the nearly circular vertical penetration-apertures is formed through the two thin sections of the top beam.

4. The Roberval load cell as claimed in claim 1, wherein each of the strain gauges is bonded to the two thin sections near the fixed portions of the pair of the top and the bottom beams while each of the nearly circular vertical penetration-apertures is formed through the two thin sections near the movable portions of the pair of the top and the bottom beams.

5. The Roberval load cell as claimed in claim 1, wherein each of the strain gauges is bonded to the two thin sections near the movable portions of the pair of the top and the bottom beams while each of the nearly circular vertical penetration-apertures is formed through the two thin sections near the fixed portions of the pair of the top and the bottom beams.

\* \* \* \* \*